(12) United States Patent
Gilbert

(10) Patent No.: US 6,486,746 B1
(45) Date of Patent: Nov. 26, 2002

(54) TERMINATION CIRCUIT FOR DECOUPLING UNUSED WIRES ON A NETWORK DEVICE'S UNSHIELDED TWISTED PAIR (UTP) CABLE

(75) Inventor: Stewart L. Gilbert, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/608,306

(22) Filed: Jun. 30, 2000

(51) Int. Cl.$^7$ ................................................ H04L 12/28
(52) U.S. Cl. ...................... 333/22 R; 333/124
(58) Field of Search ................................ 333/22 R, 124, 333/17.3

(56) References Cited

U.S. PATENT DOCUMENTS 5,474,474 A  * 12/1995  Siemon et al. ................. 333/1
5,747,893 A  *  5/1998  Bennet et al. ............... 333/124
5,825,259 A  * 10/1998  Harpham ................... 333/22 R
6,275,864 B1 *  8/2001  Mancusi et al. ............. 709/250

* cited by examiner

Primary Examiner—Justin P. Bettendorf
Assistant Examiner—Damian E. Cathey
(74) Attorney, Agent, or Firm—Fish & Richardson P.C.

(57) ABSTRACT

A termination circuit for unused wires in an unshielded twisted pair (UTP) cable in a local area network (LAN) device. In an eight wire UTP cable, four wires may be unused. The four unused wires are shorted to each other at a point of termination which is electrically connected to ground across a terminating resistive element having a resistance value in a range of about 0.36 to about 0.62 of a differential impedance of the UTP cable, e.g., 36 to 62 ohms for a UTP cable having a differential impedance of 100 ohms.

22 Claims, 3 Drawing Sheets

TERMINATION CIRCUIT FOR DECOUPLING UNUSED WIRES ON A NETWORK DEVICE'S UNSHIELDED TWISTED PAIR (UTP) CABLE

BACKGROUND

Local area networks (LANs) often use unshielded twisted pair (UTP) cables as transmission lines for high frequency communication of data between devices. The UTP cable often has four twisted pairs, each pair including two conductors or wires. Some LAN cabling schemes only use four of these wires, leaving four wires unused.

Current may be created in the unused wires due to differences in the ground potential between the LAN devices, coupling of currents from adjacent used wires, or an impedance mismatch between the wires and the local ground. If the unused wires are not properly terminated in the LAN device, the unused wires may produce unwanted electrical noise, radiated electromagnetic emissions, and electrostatic discharge (ESD) and electrical fast transient (EFT) events on or near the UTP cable.

BRIEF DESCRIPTION OF THE DRAWINGS

Like reference symbols in the various drawings indicate like elements.

DETAILED DESCRIPTION

Figure 1:
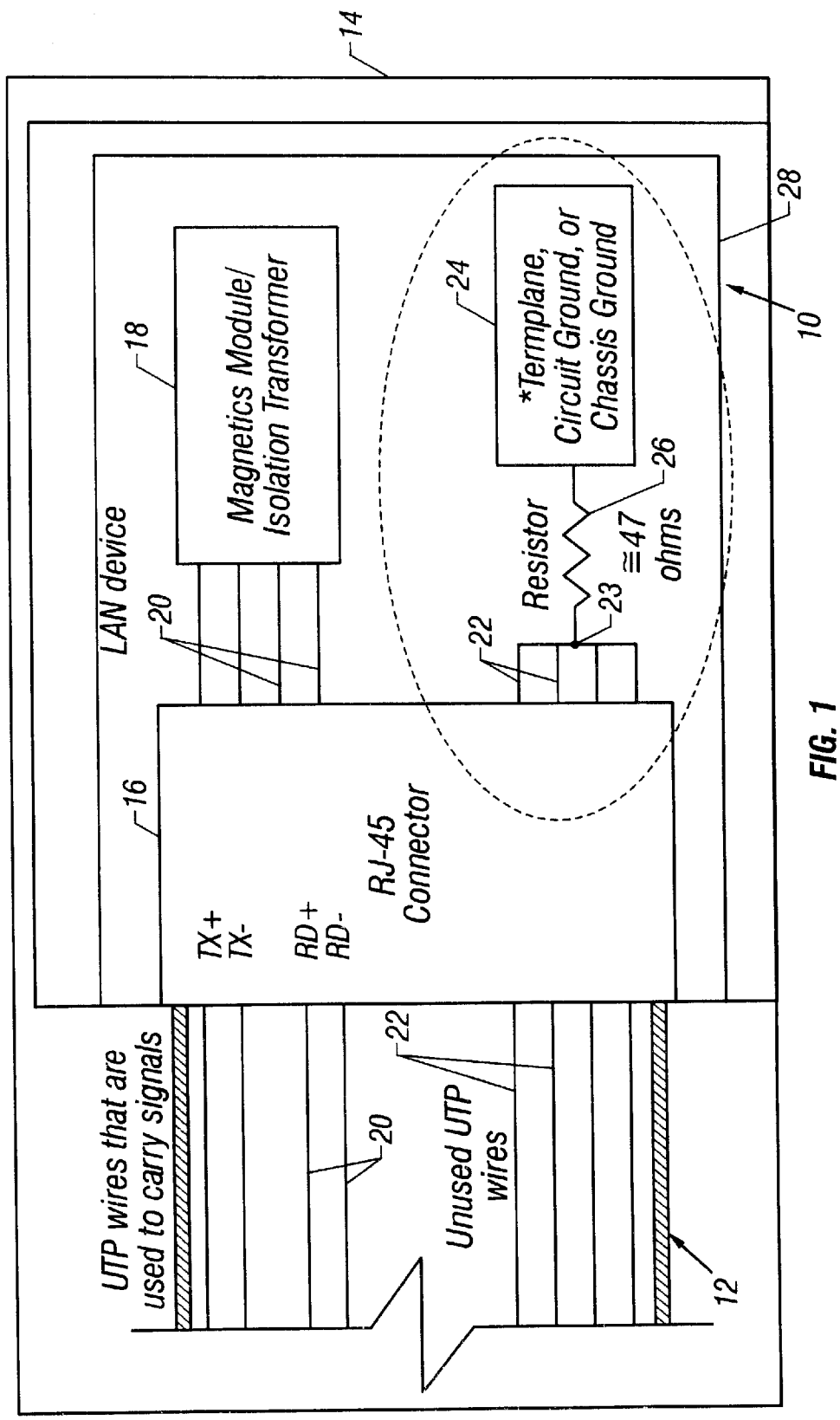
FIG. 1 is a schematic diagram of a termination circuit for a cable having eight wires according to an embodiment.

FIG. 1 illustrates a termination circuit 10 for an unshielded twisted pair (UTP) cable 12 in a local area network (LAN) device 14 according to an embodiment. The UTP cable 12 interconnects two LAN devices, or other devices adapted to transmit and receive signals over UTP wiring. The LAN device 14 may include a connector module 16 for connecting the wires in the cable 12 and a magnetics module/isolation transformer 18.

The UTP cable 12 may include eight conductors, or wires 20, 22. Some LAN signaling schemes use only four of the eight wires in the UTP cable to transmit data. The four used wires 20 may be connected to ports in the respective devices that are connected to transmit and receive circuits in the LAN device. The four unused wires 22 may be terminated by the termination circuit 10 in the LAN device 14. The unused wires in the other LAN device may be terminated or unterminated.

The four unused wires 22 may be terminated by electrically connecting (shorting) the wires together at a point of termination 23, and coupling the connected ends to ground 24 across a terminating resistive element 26. The ground 24 may be a circuit ground, chassis ground, or a termplane. A termplane is a component which may provide a capacitive coupling to ground. The connector 16, magnetics module 18, termination 23 of the unused wires, the resistive element 26, and ground 24 may all be provided on a printed circuit board (PCB) 28. If space on the PCB 28 is limited, one or more high voltage capacitors may be substituted for the termplane.

According to the present embodiment, the UTP cable 12 may have a differential impedance of about 100 ohms, and the resistive element 26 may have a value of about 47±5% ohms. According to another embodiment, the resistor may have a value in a range from about 36 ohms to about 62 ohms.

The resistance value of the resistive element 26 may be directly scaled for UTP cables with other differential impedance values. For example, for a UTP cable with 200 ohm differential impedance, a resistive element with a value of about 94±5% ohms, i.e., 2×47 ohms, may be selected, or according to an alternate embodiment, a resistive element with a value in a range of from about 72 ohms to about 124 ohms.

Figure 2:
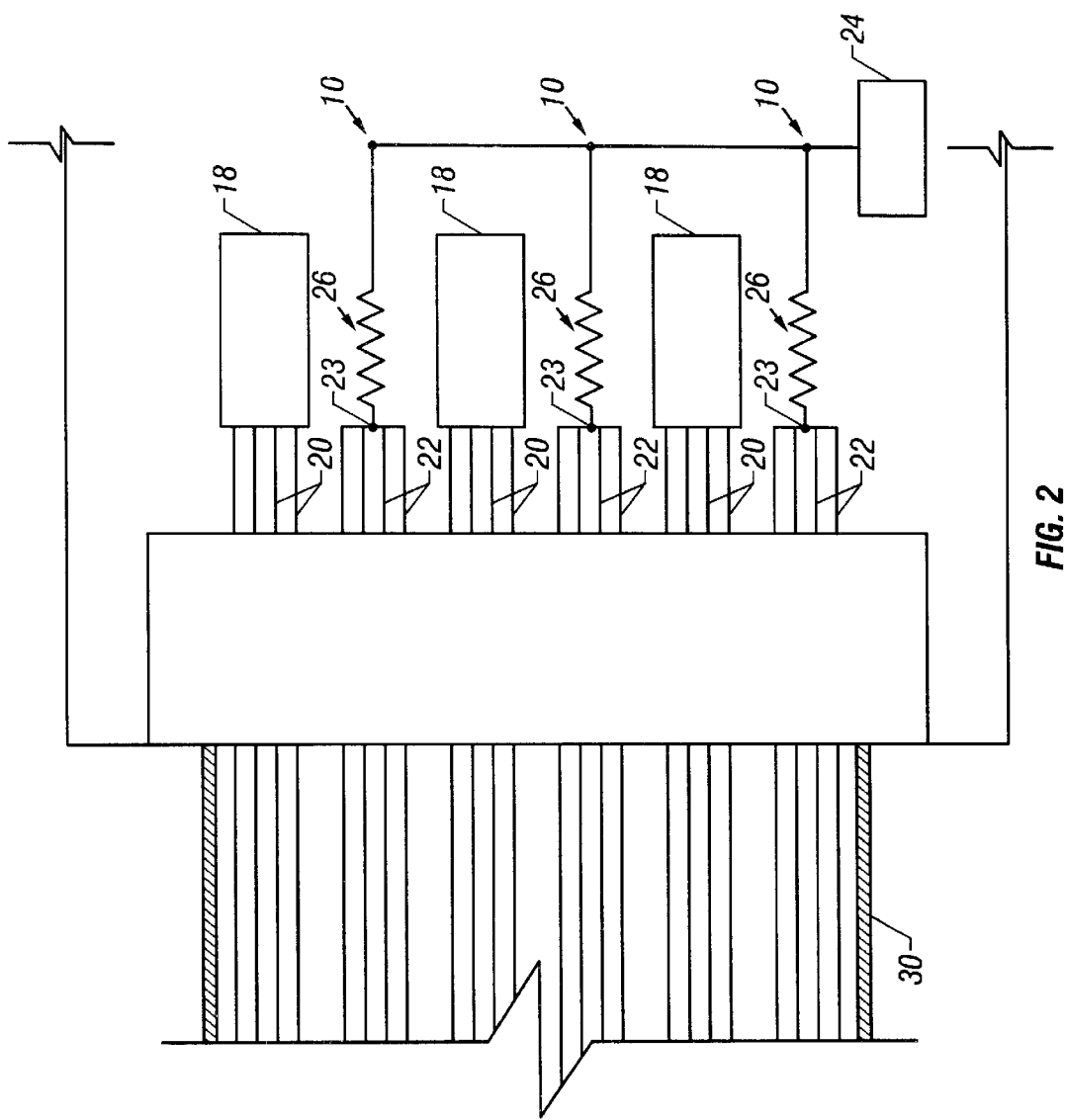
FIG. 2 is a schematic diagram of a termination circuit having twenty four wires according to another embodiment.

According to another embodiment, the termination circuit 10 may be-used in a UTP cabling scheme having integer multiples of the eight conductor arrangement with four used and four unused wires. For example, the UTP cable 30 shown in FIG. 2 has twenty-four wires, but only twelve wires 20 are used for signaling while the other twelve wires 22 are unused. According to this embodiment, the termination circuit 10 may be replicated three times, one for every group of four unused wires. The wires within each unused pair may be electrically connected together (shorted) at the point of termination, that is, at or before the point where they are connected to the terminating resistance.

The termination circuit 10 may prevent reflection of undesired currents generated in the unused wires. LAN devices generally transmit and receive high frequency signals over UTP cable. The transmission lines, i.e., used wires, may carry different types of currents. These include differential mode current and common mode current, both of which may couple to the adjacent unused twisted pair wires.

Differential mode current may be used to transmit data. Differential mode signal current is the portion of the overall currents that flow in opposite directions in the wires. Differential mode currents pass out one wire of a twisted pair and return on the other wire, making a loop. At any point along the wire pair equal, currents are flowing in two different directions. This tends to cancel out an external field due to this current.

Common mode current includes the algebraic sum of all currents flowing in the transmission line. Common mode current flows longitudinally, the same direction in both wires and uses the earth as the return path. This may produce large fields around the twisted pair which may couple to other twisted pairs. Common mode currents may be caused by imperfections in the wire which convert a fraction of the wanted differential mode signals to common mode currents. Common mode currents may also cause unwanted emissions. These same imperfections may also convert a fraction of external common mode interference into differential mode signals, thereby worsening signal-to-noise ratios and/or digital signal integrity, and causing problems with immunity.

Common mode currents may be small in amplitude, but their large loop areas may also create electromagnetic interference (EMI) problems.

The differential mode and common mode currents generated in the used wires 20, and external common mode interference may be coupled to the unused wires. This coupling may cause electrical noise and electromagnetic emissions in the unused wires 22.

Currents may also be generated in the unused wires 22 due to differences in the ground potential of the LAN devices at each end of the UTP cable. This difference in ground potential may cause a current to flow on the unused wires resulting in a ground loop. A ground loop may be dangerous to equipment and personnel. If the metal chassis ground, there may be a shock hazard. If the difference between the potentials is great enough, there may be risk of excessive heating or fire. The power that must be dissipated may be represented as $E^2/R$, where E is the voltage difference between the grounds and R is the resistance of the cable. Since the resistance in the UTP cable is generally relatively low, the power that must be dissipated may generate excessive heat.

The resistive element 26 may prevent impedance mismatch between ground and the unused wire, which is generally not zero ohms with respect to the LAN device's ground.

The termination circuit 10 according to the present embodiment may thereby reduce electrical noise in the wires and electromagnetic emissions in the cable and LAN device by reducing reflection (ringing) of common mode currents at the terminal end of the wires in the LAN device 14 and grounding much of the current.

The termination circuit may also reduce unwanted crosstalk noise and improve the LAN device's 14 immunity to electrostatic discharge (ESD) and electrical fast gradient (EFT) events on or near the LAN cable. Unlike crosstalk noise which generally have relatively small amplitudes, ESD and EFT events produce relatively large electrical transients in the wire. The termination circuit may decrease the amplitude of the event and divert most of the energy to the ground.

According to an embodiment, a range of values for the resistive element 26 may be based on an impedance of the PCB 28 between the ground 26 and the unused wires 22 at the LAN device's 14 connector pins. The average impedance for two PCBs between the unused wires at the connector pins and the termplane 26 was determined according to the present embodiment. The PCBs tested were a Jefferson 10/100 Ethernet LAN adapter, model -005 PB/PBA and an Albany 10/100 Ethernet LAN adapter, model 721503-003PB/-003PBA. The connector was a shielded, side-entry, surface mount RJ-45 connector of the type manufactured by Molex, Inc. Output port for the unused wires at pins 4, 5, 7, and 8 of the RJ-45 were soldered to one test pin. The termplane 26 was soldered to the other test pin. An SD-24 TDR sampling head was used in a 11801C oscilloscope to measure the differential impedance. The results are shown in Table 1.

TABLE 1

| | Impedance 4, 5, 7, 8 to Termplane, w/o R | | | | | Average |
| --- | --- | --- | --- | --- | --- | --- |
| | Upper Trace | | Lower Trace | | Average | Impedance of |
| Cable Description | Min. | Max. | Min. | Max. | Impedance | All PBA's |
| Jefferson 10/100 LAN Adapter -005 PB & PBA | 440.85 | 552.44 | 551.98 | 666.11 | 52.8450 | Belden Average |
| Albany 10/100 LAN Adapter 721503-003PB, -003PBA | 332.63 | 448.37 | 332.98 | 557.73 | 42.9275 | 47.8863 |

As shown in Table 1, the average impedance of the PCBs was 47.88 ohms. To match the impedance of this circuit, a range of values for the resistive element may be between 43 ohms and 53 ohms.

According to another embodiment, a range of values for the resistive element 26 may be based on a differential impedance between the used wires 20 and the unused wires 22. The differential impedance between the used wires 20 and the unused wires 22 at the connector pins was determined according to the present embodiment for a number of different types of twisted pair wires. The connector was an RJ-45 connector.

Pins 4, 5, 7, and 8 of the RJ-45 connector, to which the unused wires 22 were output, were soldered to one test pin. Pins 1, 2, 3, and 6, to which the used wires 20 were output, were soldered to the other test pin. An SD-24 TDR sampling head was used in a 11801C oscilloscope to measure the differential impedance between the two test pins. The results are shown in Table 2.

TABLE 2

| | Impedance 1, 2, 3, 6 to 4, 5, 7, 8 | | | | | Average |
| --- | --- | --- | --- | --- | --- | --- |
| | Upper Trace | | Lower Trace | | Average | Impedance per |
| Cable Description | Min. | Max. | Min. | Max. | Impedance | Vendor or Type |
| Belden-m DataTwist(R) CAT5, Gray Jacket w/blue text | 37.36 | 45.35 | 36.99 | 44.93 | 41.1575 | Belden Average |

TABLE 2-continued

| | Impedance 1, 2, 3, 6 to 4, 5, 7, 8 | | | | | Average |
| --- | --- | --- | --- | --- | --- | --- |
| | Upper Trace | | Lower Trace | | Average | Impedance per |
| Cable Description | Min. | Max. | Min. | Max. | Impedance | Vendor or Type |
| Belden-m DataTwist(R) CAT5, Gray Jacket w/black text | 39.66 | 46.20 | 40.06 | 46.20 | 43.0300 | 51.3050 |
| Belden-m DataTwist(R) CAT5, Blue Jacket w/black text | 59.74 | 74.22 | 58.23 | 72.41 | 66.1500 | |
| Belden-m DataTwist(R) CAT5, Blue Jacket w/thin black text | 60.77 | 69.49 | 60.26 | 70.07 | 65.1475 | |
| Belden-m DataTwist(R) CAT5, Blue Jacket w/blue text | 37.36 | 44.51 | 37.36 | 44.93 | 41.0400 | |
| Unicom Patch Cord CAT5, Yellow Jacket | 61.29 | 71.23 | 61.29 | 71.23 | 66.2600 | Unicom Average |
| Unicom Patch Cord CAT5, Cream Color Jacket | 37.36 | 43.68 | 37.36 | 42.86 | 40.3150 | 53.2875 |
| Black Box Corporation Cat 5, Red Jacket | 59.24 | 68.35 | 58.73 | 68.92 | 63.8100 | Miscellaneous CAT5 Average |
| Lucent-D Systemax CAT5, Red Jacket | 65.56 | 77.94 | 64.47 | 79.21 | 71.7950 | 64.4655 |
| General Cable CAT5, Gray Jacket | 54.32 | 67.22 | 53.37 | 65.02 | 59.9825 | |
| Quabbin DataMax(R) CAT5, Cream Color Jacket | 56.74 | 68.35 | 55.28 | 66.11 | 61.6200 | |
| Ortronics OSA-ELP-5, Yellow Jacket | 57.23 | 73.01 | 57.23 | 73.01 | 65.1200 | |
| AT&T-D CAT3, Putty Gray Jacket with pink text | 35.87 | 51.06 | 36.24 | 50.15 | 43.3300 | CAT 3 Average 41.6775 |
| Essex CAT3, Putty Gray Jacket with black text | 29.53 | 36.61 | 28.53 | 37.36 | 33.0075 | |
| General Cable CAT3, Putty Gray Jacket with red text | 40.06 | 56.25 | 41.24 | 57.23 | 48.695 | |

As shown in Table. 2, the average impedance of the cables was 54.0 ohms. To match the impedance of this circuit, a range of values for the resistive element may be between 39 ohms and 62 ohms. Forty-seven ohms is a standard resistance value near the center of the range and may be used as a starting point to find a desired resistance.

Figure 3:
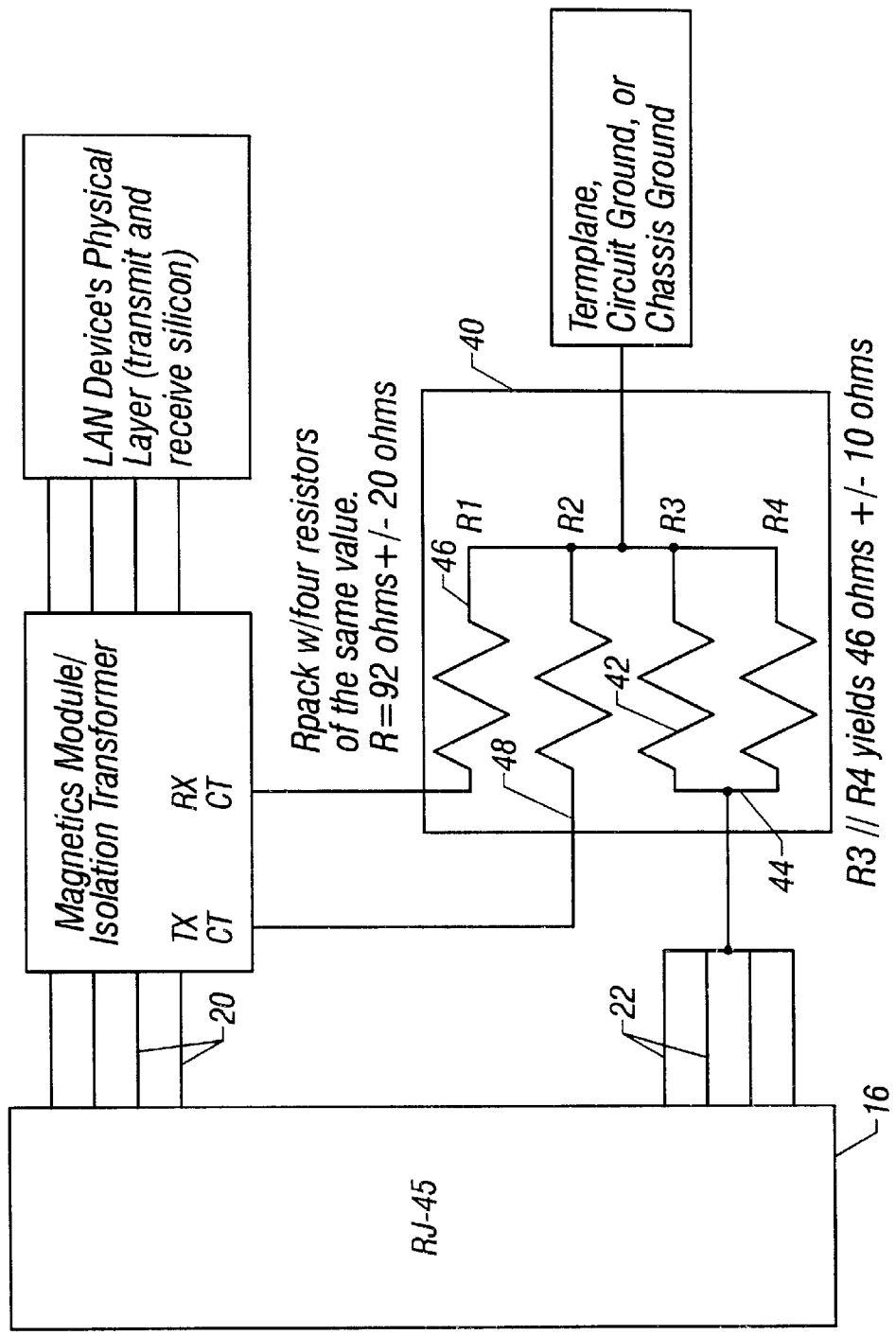
FIG. 3 is a schematic diagram of a termination circuit including an equivalent resistor according to yet another embodiment.

According to an embodiment, the resistive element may be equivalent resistor including a number of resistive elements in series and/or parallel. As shown in FIG. 3, the resistive element may be two resistors 42, 44 of a four resistor "Rpack" 40 such as a 3.2 mm×1.6 mm EXB chip resistor array manufactured by Panasonic. An Rpack may include several small resistors in a surface mount technology (SMT) package, and are often used because they tend to be less expensive than larger, discrete resistors.

To minimize radiated electromagnetic emissions, the magnetic center-tap resistors 46, 48 may need to be greater than 60 ohms. To achieve the resistive range of 36 to 62 ohms according to the present embodiment, the Rpack may have a value between about 72 ohms and 124 ohms, such that connecting terminating resistors 42, 44 in parallel will produce an equivalent resistance in the identified range, while providing an appropriate resistance in resistors 46, 48 at the magnetic center-taps for the transmit and receive lines. A larger, discrete resistor may be substituted for the Rpack if a higher degree of voltage isolation is required.

According to an embodiment, a capacitive element having a relatively low series resistance and a value below about 1 uF may be electrically connected in parallel to the resistive element. For example, a 1500V rated 1000pF capacitor may be electrically connected to the resistive element 26.

According to various embodiments, the termination circuit may be located on an add-in card for personal computers, on a motherboard, or on system PCBs. The termination circuit 10 may also be incorporated into the connector module 16 that mates to the UTP cable 12, or into integrated modules that contain the connector module 16, the magnetics module 18, and termination circuit 10.

The termination circuit 10 according to various embodiments may be utilized in other communication technologies that employ UTP cable, in which the cable includes eight conductors, but only four of the cable's conductors are used. This may include, but is not limited to, Token Ring LAN, 10Base-T Ethernet, 100Base-TX Ethernet, and asynchronous transfer mode (ATM) networking over UTP cable.

A number of embodiments of the invention have been described. Nevertheless, it will be understood that various modifications may be made without departing from the spirit and scope of the invention. Accordingly, other embodiments are within the scope of the following claims.

What is claimed is:

1. Apparatus comprising:
    a transmission line having a differential impedance value and comprising a plurality of used wire pairs and a plurality of unused wire pairs, said plurality of unused wire pairs being electrically connected at a point of termination; and
    a resistive element having a first end electrically connected to the point of termination and a second end electrically connected to a grounding element, said resistive element having a resistance substantially matching a differential impedance between the plurality of used wire pairs land the plurality of unused wire pairs.

2. The apparatus of claim 1, wherein the transmission line comprises an unshielded twisted pair (UTP) cable.

3. The apparatus of claim 1, wherein the transmission line comprises four used wires and four unused wires.

4. The apparatus of claim 1, wherein the differential impedance value of the transmission line is about 100 ohms.

5. The apparatus of claim 4, wherein the resistance of the resistive element is about 47±5% ohms.

6. The apparatus of claim 1, wherein the resistive element has a resistance in a range of about 0.36 to about 0.62 of the differential impedance value of the transmission line.

7. The apparatus of claim 1, wherein the resistive element has a resistance in a range from 0.47 to 0.48 of the differential impedance value of the transmission line.

8. The apparatus of claim 1, further comprising:
a second plurality of unused wires, said second plurality of unused wires being electrically connected at a second point of termination, and a second resistive element having a first end electrically connected to the second point of termination and a second end electrically connected to ground, said resistive element having a resistance in a range of about 0.36 to about 0.62 of the differential impedance value of the transmission line.

9. Apparatus for terminating unused wires in a transmission line, said apparatus comprising:
a substrate;
a connector having a first plurality of input ports adapted to receive a plurality of used wire pairs and a second plurality of input ports adapted to receive a plurality of unused wire pairs in a transmission line having a differential impedance and a plurality of output ports electrically connected to the second plurality of input ports, said plurality of output ports being electrically connected together at a terminal node;
a grounding element adapted to be electrically connected to ground;
a resistive element electrically connected to the terminal qnode at a first end and electrically connected to the grounding element at a second end, said resistive element having a resistance substantially matching a differential impedance between the plurality of used wire pairs and the plurality of unused wire pairs.

10. The apparatus of claim 9, wherein the substrate comprises a printed circuit board.

11. The apparatus of claim 9, wherein the transmission line comprises a UTP cable.

12. The apparatus of claim 9, wherein the transmission line comprises four used wires and four unused wires.

13. The apparatus of claim 9, wherein the transmission line has a differential impedance of about 100 ohms.

14. The apparatus of claim 9, wherein the resistive element has a resistance in a range of about 0.36 to about 0.62 of the differential impedance value of the transmission line.

15. A method comprising:
providing a transmission line having a differential impedance and comprising a plurality of used wire pairs and a plurality of unused pairs;
electrically connecting the plurality of unused wire pairs at a terminal node;
electrically connecting the plurality of used wire pairs at a testing node;
determining a differential impedance between the plurality of used wire pairs and the plurality of unused wire pairs;
disconnecting the plurality of used wire pairs from the testing node; and
electrically connecting the terminal node to ground across a resistive element having a resistance substantially matching a differential impedance between the plurality of used wire pairs at the testing node and the plurality of unused wire pairs at the terminal node.

16. The method of claim 15, wherein the transmission line comprises a UTP cable.

17. The method of claim 15, wherein the transmission line comprises four used wires and four unused wires.

18. The method of claim 15, wherein the UTP cable has a differential impedance of about 100 ohms.

19. The method of claim 15, wherein the resistive element has a resistance in a range of about 0.36 to about 0.62 of the differential impedance value of the transmission line.

20. The method of claim 15, wherein said transmission line comprises an untwisted pair (UTP) cable having a differential impedance of about 100Ω.

21. The method of claim 20, wherein said determining the differential impedance comprises beginning with a resistance value of about 47Ω.

22. The method of claim 20, wherein said determining the differential impedance comprises beginning with a resistance value of about 56Ω.

* * * * *